(12) United States Patent
Silver et al.

(10) Patent No.: US 7,844,047 B1
(45) Date of Patent: *Nov. 30, 2010

(54) TUNE MASTER INTERNET PROTOCOL DEVICE

(75) Inventors: Edward Michael Silver, Atlanta, GA (US); Linda Ann Roberts, Decatur, GA (US); Hong Thi Nguyen, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1043 days.

This patent is subject to a terminal disclaimer.

(21) Appl. No.: 10/200,935

(22) Filed: Jul. 23, 2002

(51) Int. Cl.
*H04M 1/00* (2006.01)
*H04M 3/00* (2006.01)

(52) U.S. Cl. .................................. 379/374.01

(58) Field of Classification Search ............ 379/142.05, 379/142.15, 88.21, 374.01; 455/415
See application file for complete search history.

(56) References Cited

U.S. PATENT DOCUMENTS

| | | | |
|---|---|---|---|
| 4,480,153 A | 10/1984 | Festa | |
| 5,384,831 A | 1/1995 | Creswell et al. | |
| 5,544,229 A | 8/1996 | Creswell et al. | |
| 6,114,724 A | 9/2000 | Ratnakumar | |
| 6,314,306 B1 | 11/2001 | Harris | |
| 6,366,791 B1 | 4/2002 | Lin et al. | |
| 6,381,594 B1 | 4/2002 | Eichstaedt et al. | |
| 6,418,330 B1 | 7/2002 | Lee | |
| 6,697,470 B2 | 2/2004 | McDonough | |
| 6,707,908 B1 | 3/2004 | Nagasawa | |
| 6,804,289 B2 | 10/2004 | Takahashi | |
| 6,999,752 B2 | 2/2006 | Fukaya | |
| 7,031,453 B1 * | 4/2006 | Busardo | ................ 379/373.02 |
| 7,127,238 B2 | 10/2006 | Vandeermeijden et al. | |
| 7,197,135 B1 | 3/2007 | Silver et al. | |
| 7,356,132 B1 | 4/2008 | Silver | |
| 7,519,166 B1 | 4/2009 | Silver et al. | |
| 2002/0094076 A1 | 7/2002 | Chen | |
| 2002/0172338 A1 * | 11/2002 | Lee et al. | ................ 379/142.01 |
| 2003/0104842 A1 * | 6/2003 | Choi et al. | .................. 455/569 |
| 2004/0037403 A1 * | 2/2004 | Koch | ..................... 379/142.16 |
| 2004/0067751 A1 | 4/2004 | Vandermeijden et al. | |

OTHER PUBLICATIONS

Silver; Notice of Allowance and Fees Due mailed Dec. 12, 2007 for U.S. Appl. No. 10/201,043, filed Jul. 23, 2002.
Silver; Non-Final Rejection mailed Mar. 27, 2008 for U.S. Appl. No. 10/201,466, filed Jul. 23, 2002.
Silver; Non-Final Rejection mailed Aug. 11, 2008 for U.S. Appl. No. 10/201,466, filed Jul. 23, 2002.

(Continued)

*Primary Examiner*—Alexander Jamal
(74) *Attorney, Agent, or Firm*—Thomas, Kayden, Horstemeyer & Risley, LLP (57) ABSTRACT

Systems for providing a tune master internet protocol (IP) device includes a communications network configured to provide caller identification information for an incoming telephone call and a processor that is coupled to the communications network. The processor is configured with telephony capabilities and to receive the caller identification information for an incoming telephone call, to access a storage device having tunes, to associate a tune with the caller identification information, and to play the associated tune as notification of the incoming telephone call. Other systems and methods are also provided.

34 Claims, 5 Drawing Sheets

OTHER PUBLICATIONS

Silver; Notice of Allowance and Fees Due mailed Dec. 3, 2008 for U.S. Appl. No. 10/201,466, filed Jul. 23, 2002.
Silver; U.S. Appl. No. 12/421,175, filed Apr. 9, 2009.
Silver; U.S. Appl. No. 12/421,179, filed Apr. 9, 2009.
Softswitch Consortium; Reference Archectiture, Jun. 2002, vol. 1.2.
Commworks Position Paper; Softswitch Model Drives New Age of a Customized Communication, www.softswitch.org/education/reference.asp, in existence at least as of Sep. 9, 2002.
Silver; Non-Final Rejection mailed Mar. 28, 2005 for U.S. Appl. No. 10/201,466, filed Jul. 23, 2002.
Silver; Non-Final Rejection mailed Jan. 3, 2006 for U.S. Appl. No. 10/201,466, filed Jul. 23, 2002.
Silver; Non-Final Rejection mailed Jun. 8, 2006 for U.S. Appl. No. 10/201,466, filed Jul. 23, 2002.
Silver; Non-Final Rejection mailed Nov. 15, 2006 for U.S. Appl. No. 10/201,466, filed Jul. 23, 2002.
Silver; Final Rejection mailed Apr. 26, 2007 for U.S. Appl. No. 10/201,466, filed Jul. 23, 2002.
Silver; Non-Final Rejection mailed Jul. 9, 2007 for U.S. Appl. No. 10/201,466, filed Jul. 23, 2002.
Silver; Non-Final Rejection mailed Oct. 30, 2007 for U.S. Appl. No. 10/201,466, filed Jul. 23, 2002.
Silver; Non-Final Rejection mailed Dec. 15, 2004 for U.S. Appl. No. 10/201,043, filed Jul. 23, 2002.
Silver; Final Rejection mailed Jul. 14, 2005 for U.S. Appl. No. 10/201,043, filed Jul. 23, 2002.
Silver; Notice of Allowance and Fees Due mailed Nov. 4, 2005 for U.S. Appl. No. 10/201,043, filed Jul. 23, 2002.
Silver; Notice of Allowance and Fees Due mailed May 4, 2002 for U.S. Appl. No. 10/201,043, filed Jul. 23, 2002.
Silver; Non-Final Rejection mailed Dec. 4, 2006 for U.S. Appl. No. 10/201,043, filed Jul. 23, 2002.
Silver; Final Rejection mailed Aug. 9, 2007 for U.S. Appl. No. 10/201,043, filed Jul. 23, 2002.
Silver; Advisory Action mailed Oct. 2, 2007 for U.S. Appl. No. 10/201,043, filed Jul. 23, 2002.
Silver; U. S. Patent Application filed Jul. 23, 2002, U.S. Appl. No. 10/201,043; entitled Tune Master Telephone.
Silver; U. S. Patent Application filed Jul. 23, 2002, U.S. Appl. No. 10/201,466; entitled Tune Master Caller Identification Device.

* cited by examiner

TUNE MASTER INTERNET PROTOCOL DEVICE

TECHNICAL FIELD

The present invention is generally related to telecommunications and, more particularly, is related to systems and methods for call ringing.

BACKGROUND OF THE INVENTION

Telephone users find it useful to know the identity of a person calling prior to answering a telephone call. One solution involves providing caller identification information to the called party. Generally, caller identification information includes area code, telephone number, name, and/or city and state information on the calling party. Typically, a user subscribes to a caller identification service from a telephone service provider that presents the caller identification information along with a ringing notification of an incoming telephone call. Effective use of caller identification information often requires the user to have a caller identification equipped telephone or other device, nearby when the telephone rings indicating an incoming call. This is often necessary so that the user can view a display showing the caller identification information prior to answering the call. However, a user may not always be near the device that displays the caller identification information, and thus may not have an opportunity to determine who is calling before answering the telephone.

Thus, a heretofore-unaddressed need exists for a solution that addresses the aforementioned deficiencies and inadequacies.

SUMMARY OF THE INVENTION

The preferred embodiments of the present invention provide systems and methods for a tune master Internet Protocol (IP) device.

Briefly described, in architecture, one preferred embodiment of the system, among others, can be implemented as follows. A tune master Internet protocol device system includes a communications network and a processor having telephony capabilities is operatively coupled to the communications network. The communications network is configured to provide caller identification information for an incoming telephone call to the processor. The processor is configured to receive the caller identification information for an incoming telephone call, to access a storage device having tunes, to associate a previously stored tune with the caller identification information in accordance with user configuration, and to play the associated tune as notification of the incoming telephone call.

The preferred embodiment of the present invention can also be viewed as providing methods for a tune master IP device. In this regard, one embodiment of such a method, among others, can be broadly summarized by the following steps: accessing a storage device having a selection of digitized tunes utilizing a communications network; selecting a digitized tune; associating the digitized tune with caller identification information; and playing the digitized tune on a tune master IP device as notification of the receipt of an incoming telephone call.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for a tune master IP device. To facilitate description of the inventive system, an example system that can be used to implement the systems and methods for a tune master IP device is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to provide a tune master IP device.

Figure 1:
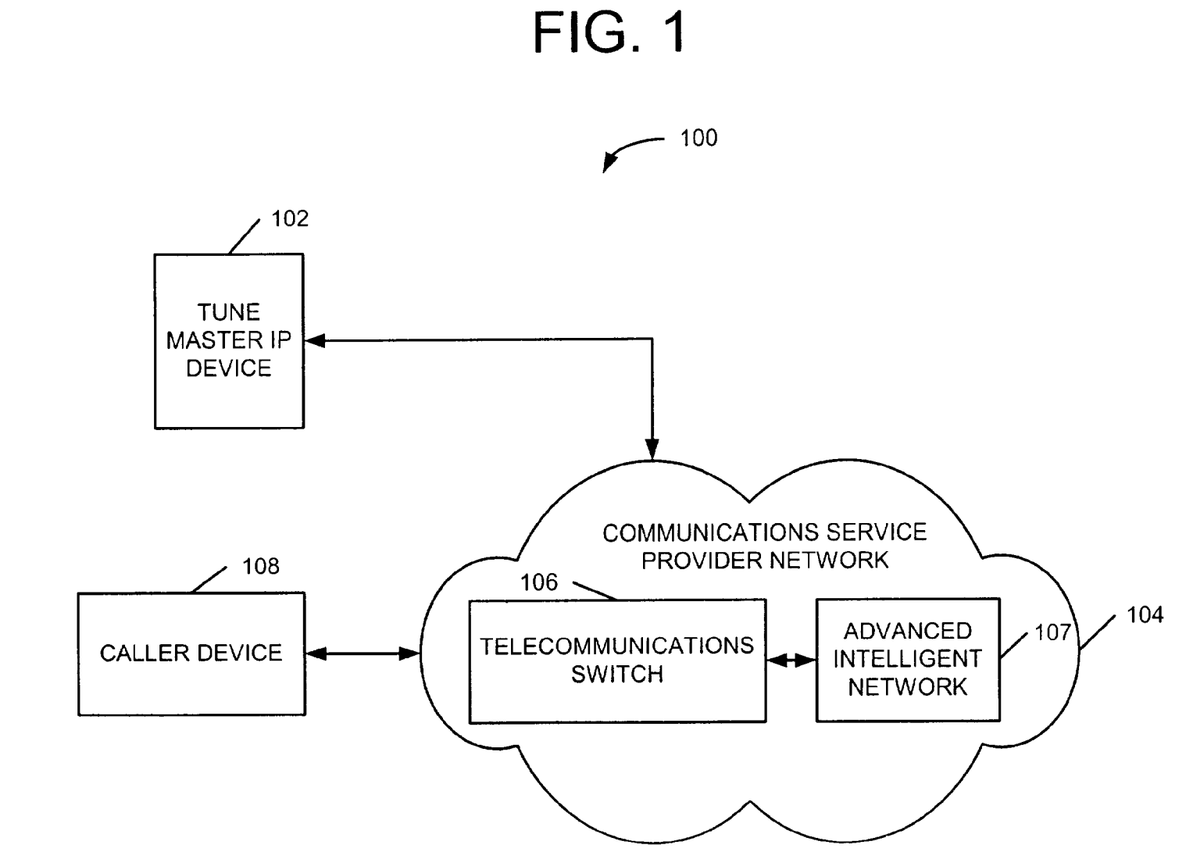
FIG. 1 is a block diagram depicting a preferred embodiment a tune master IP device system.

Referring now in more detail to the drawings, in which like numerals indicate corresponding parts throughout the several views, FIG. 1 is a block diagram depicting a preferred embodiment of a tune master IP device system 100 that includes a tune master IP device 102 and a communications service provider network 104, such as the Internet or telephone network, that is coupled to the tune master IP device 102. In a preferred embodiment, a tune master IP device 102 is a processing device adapted to communicate with the Internet, to process caller identification information, correlate a tune to the caller identification information, play the tune and answer incoming telephone calls. A web server (not shown) may be coupled to the Internet to provide processing capabilities and access to a stored selection of tunes. The communications service provider network 104 may be any type of communications network employing any network topology, transmission medium, or network protocol. For example, such a network may be any public or private packet-switched or other data network, including the Internet, circuit-switched network, such as a public switched telecommunications network (PSTN), wireless network, or any other desired communications infrastructure and/or combination of infrastructure. In one preferred embodiment, the tune master IP device 102 utilizes an Internet Service Provider (ISP) as a mechanism for the tune master IP device 102 to communicate with the Internet, as is well known in the art. In a preferred embodiment, the tune master IP device 102 is configured to provide telephone functionality and computer processing capabilities. The communications service provider network 104 preferably includes a telecommunications switch 106 that is coupled, directly or indirectly, to the tune master IP device 102 and a caller device 108. An advanced intelligent network 107 separates telephone service logic from switching equipment, such as telecommunications switch 106, and allows for distributed network intelligence.

In a preferred embodiment, the telecommunications switch 106 is encompassed in a public switched telecommunications network. In another preferred embodiment, the telecommunications switch 106 includes a packet-based "soft-switch" that uses software control to provide voice, data, and video services by dynamically changing its connection data rates and protocol types. In still another preferred embodiment, the telecommunications switch 106 supports advanced intelligent network 107 componentry that controls many features of the telecommunications switch 106.

In a preferred embodiment, the user of the tune master IP device 102 subscribes to a caller identification service, such as a service provided by BellSouth Corporation, among others. Caller identification information can include, for instance, a telephone number of the calling party, a name of the calling party, or a city and state of the calling party. For purpose of this invention, one emphasis is on receiving the telephone number of the calling party as part of the caller identification information. In a preferred embodiment, the tune master IP device 102 is configured to receive and recognize caller identification information and to play a tune (or song, melody, etc.).

In a preferred implementation of this invention, a user of the caller device 108 initiates a telephone call to the tune master IP device 102. The incoming call and associated caller identification information is switched through at least one telecommunications switch 106 using transmission facilities of the communications service provider network 104, as is well known in the art. In a preferred embodiment, the incoming call, i.e., call request signalling, is packetized and/or digitized, and routed through the communications service provider network 104 to the Internet. The Internet is operative to recognize the IP protocol address of the tune master IP device 102, which receives the packetized telephone call and associated caller identification information. The tune master IP device 102 correlates the caller identification information with tunes accessible by the tune master IP device 102. In a preferred embodiment, a user of the tune master IP device 102 previously associated a particular tune with a particular telephone number. In response to receiving call request signalling, which would typically cause conventional telephony devices to simply ring and optionally display caller identification information if available, the Tune master IP device 102 processes the caller identification information and selects a tune from its storage device that is associated with the caller identification information of the incoming call. The tune is played as a "ring" of the tune master IP device 102. The user of the tune master IP device 102 can recognize the identity of the caller based on the tune played by the tune master IP device 102. By recognizing who is calling, the owner of the tune master IP device 102 can exercise a plurality of call answering options. For instance, the user can answer the incoming call, allow an answering system/service to answer the call, ignore the call, send the call to voice mail, or forward the call to another communications device, among other answering options.

Figure 2:
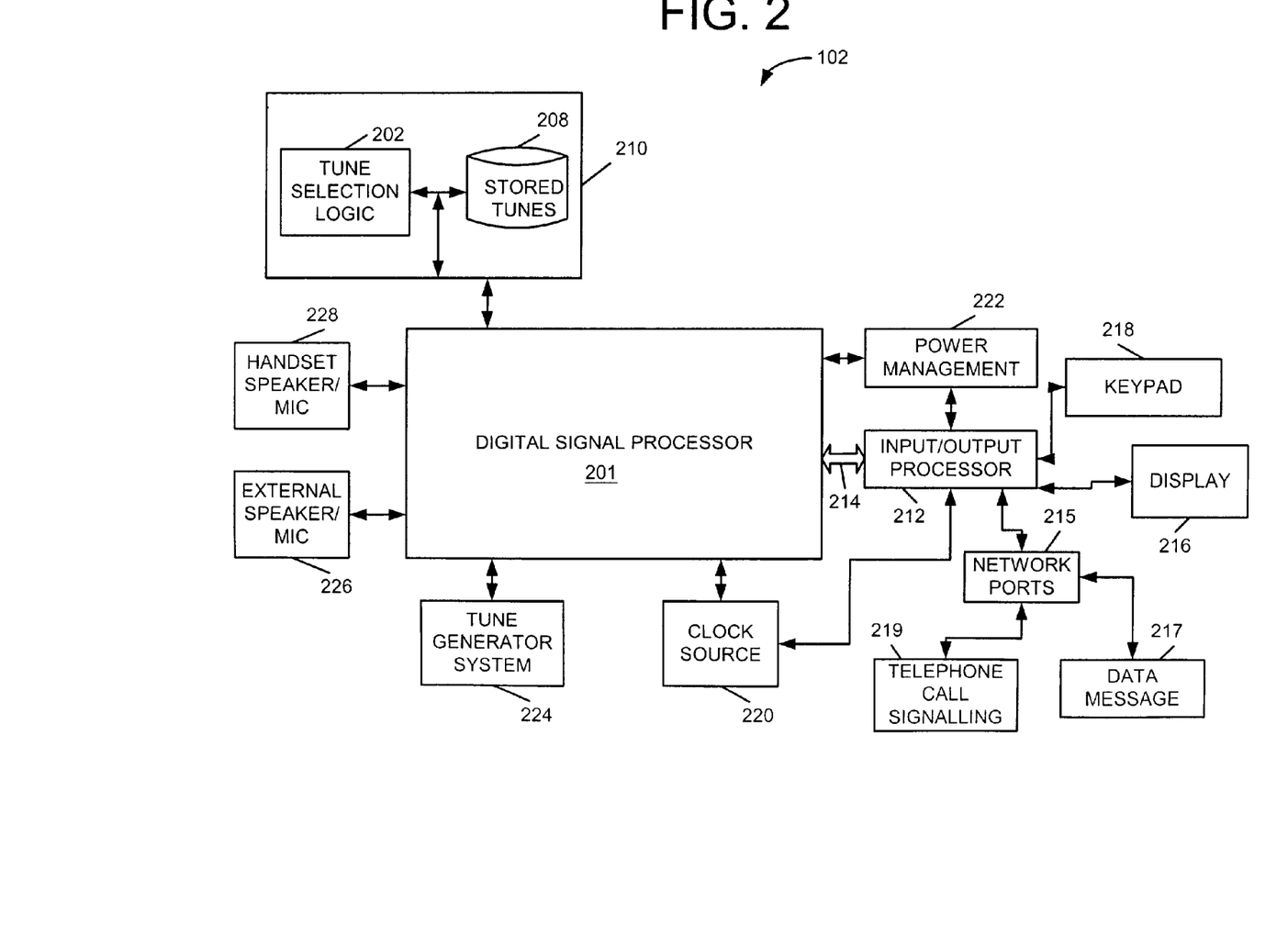
FIG. 2 is a block diagram depicting a preferred embodiment of an apparatus for implementing a tune master IP device system.

FIG. 2 is a block diagram depicting a preferred embodiment of an apparatus for implementing a tune master IP device system. The tune master IP device 102 generates a tune (or song, melody, etc.) as a ringtone for an incoming telephone call. The tune master IP device 102 includes tune selection logic 202 and stored tunes 208 located in a memory 210 connected to (or alternatively located within) a digital signal processor 201. Tune selection logic 202 can be implemented in software (e.g., programming stored on a medium, firmware, etc.), hardware, or a combination thereof. In other embodiments, the memory 210 is located external to the tune master IP device 102. However, a storage device for stored tunes 208 can include a CD-ROM, DVD, tape, cassette tape, floppy diskette, or other external or internal memory of the tune master IP device 102. In a preferred embodiment, the tunes are selected from a list of pre-programmed tunes. In another preferred embodiment, the tunes are organized according to categories such as tunes for business associates, family members, or other associates. The number and type of tunes is only limited by imagination and available space in the external or internal memory of the tune master IP device 102. In yet another preferred embodiment, the user selects tunes from any number of known Web sites that make tunes available for downloading to a computing device. The number and type of tunes is only limited by imagination and available space in the memory 210.

The digital signal processor 201 converts analog signals to digital signals and converts digital signals to analog signals. The digital signal processor 201 could include compression and decompression algorithms, cancellation algorithms, audio-processing circuitry, filter circuitry, and amplification circuitry. Although digital signal processor 201 can be designed to provide differing capabilities and a variety of performance criteria, the basic functions of the digital signal processor 201 are known, and thus, will not be further discussed.

The digital signal processor 201 interfaces with an input/output processor 212. The input/output processor 212 controls system I/O and provides telephony-like control features. A bus 214 provides a signal communication path between the digital signal processor 201 and the input/output processor 212. In a preferred embodiment, the input/output processor 212 is a microprocessor that includes memory (not shown), communication controllers (not shown), and peripheral controllers (not shown). The communication controllers, for example, could control packet-based communications with the telecommunications switch 106 through a network port 215. The communication controllers, for example, could control packet-based communications with a telecommunications switch 106 or the Internet through the network port 215. A data message 217 from a variety of sources, such as the telecommunications switch 106 or the Internet, can be sent to the digital signal processor 201 utilizing the network port 215. The data message 217 could include caller identification information associated with incoming telephone call signalling 219. When the data message 217 is received, the digital signal processor 201 interfaces with the tune selection logic 202. In one embodiment, the tune selection logic 202 instructs the digital signal processor 201 to retrieve tunes from stored tunes 208.

The peripheral controllers provide an interface with a display 216, such as a LCD/LED/CRT display and with telephony-like control features, such as a keypad 218. A clock source 220 provides a system clock for the digital signal processor 201, and the clock source 220 may also include higher and lower frequency multiples of a system clock depending upon power requirements and power availability.

A power management system 222 provides differing power control mechanisms, such as a sleep mode and a low power mode, to efficiently utilize available power and to reduce thermal management concerns.

The memory 210 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 210 may incorporate electronic, magnetic, optical, and/or other types of storage media. Note that the memory 210 can have a distributed architecture, where various components are situated remote from one another, but can be accessed by the processing device 201. The software and/or firmware in memory 210 may include one or more separate programs, each of which comprises an ordered listing of executable instructions for implementing logical functions.

The tune selection logic 202 is preferably a source program, executable program (object code), script, or any other entity comprising a set of instructions to be performed. When the tune selection logic 202 is implemented as a source program, then the program needs to be translated via a compiler, assembler, interpreter, or the like, which may or may not be included within the memory 210. Furthermore tune selection logic 202 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

When the tune selection logic 202 is implemented in software the tune selection logic 202 can preferably be stored on any computer-readable medium for use by or in connection with any computer related system or method. The tune selection logic 202 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and an optical fiber (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. If implemented in hardware, as in an alternative embodiment, the tune selection logic 202 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The digital signal processor 201 interfaces with a tune generation system 224. In a preferred embodiment, the tune generation system 224 executes the selected tune and provides the tune. Execution of the selected tune can include correlating the incoming caller identification information with a tune associated with the caller identification information, and then playing the tune in place of the standard ringtone. In another preferred embodiment, the tune generation system 224 plays the standard ringtone as a default if the caller identification information does not have a tune associated with it, or the caller identification information is not presented to the digital signal processor 201. In another preferred embodiment, the tune generation system 224 plays a selectable default tune when no caller identification information is presented. The tune generation system 224 and the digital signal processor 201 could also interface with an external speaker/microphone (mic) system 226 to audibly present the selected tune. A conventional analog handset/microphone 228 that interfaces with the digital signal processor 201 can be used to accept the incoming telephone call upon receipt of the tune identifying the particular caller.

Figure 3:
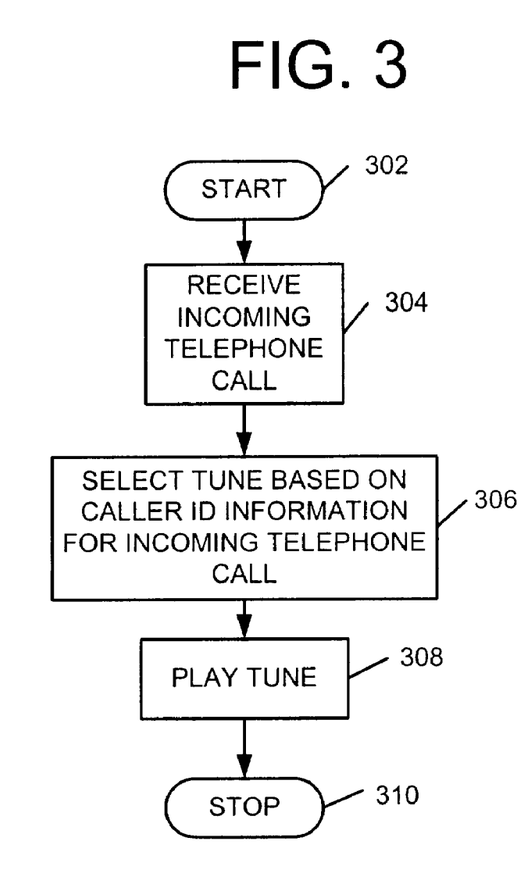
FIG. 3 is a flow chart depicting functionality of a preferred embodiment of an implementation of a tune master IP device system.

FIG. 3 is a flow chart depicting functionality (or a method) of a preferred embodiment of an implementation of a tune master IP device system. The process begins at 302. At 304, the tune master IP device receives an incoming telephone call. In a preferred embodiment, the telephone call, i.e., ring signalling, is sent to the tune master IP device with, or nearly with, associated caller identification information. The tune master IP device interrupts the normal ring detection process. At 306, the tune master IP device selects a tune to use as the ringing notification based on tunes associated with the caller identification information for the incoming telephone call. At 308, the tune master IP device plays the tune selected at 306. The process ends at 310.

Figure 4:
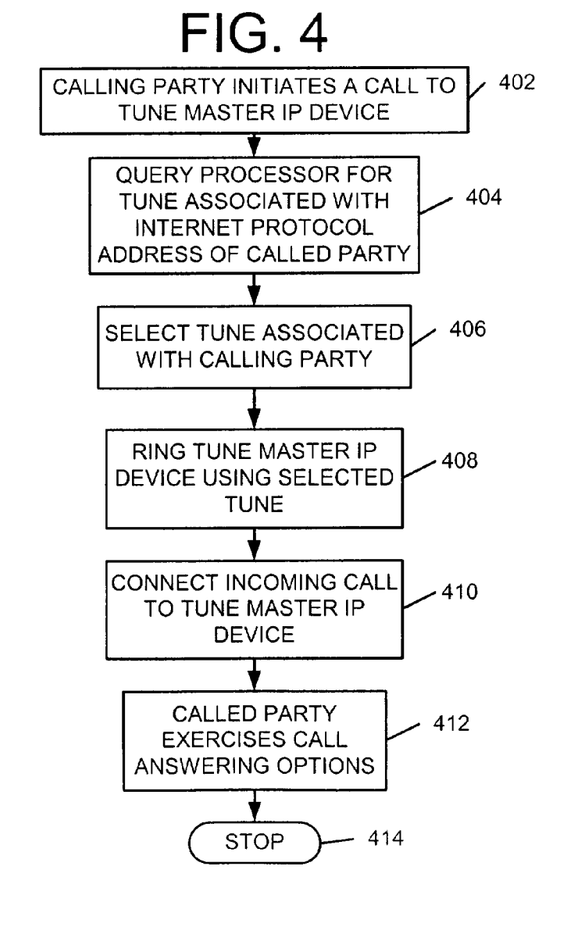
FIG. 4 is a flow chart depicting functionality of a preferred embodiment of an implementation of a tune master IP device system.

FIG. 4 is a flow chart depicting more specific functionality (or a method) of a preferred embodiment of an implementation of a tune master IP device system. The process can be construed as beginning at 402, with a caller initiating a telephone call to a tune master IP device. In a preferred embodiment, the telephone call, i.e., ring signalling has caller identification information associated with it. In response to receiving the call request signalling, which would typically cause conventional telephones to simply ring as usual and optionally display caller identification information if available, at 404, the tune master IP device selects the tune from its storage device that is associated with the caller identification information, such as a telephone number or interne protocol address of the incoming call. At 406, a tune associated with the calling party is selected. At 408, the tune master IP device rings using the tune selected at step 406. At 410, the incoming call is connected to the tune master IP device. At 412, the called party now knows the identity of the calling party (based on the tune played) and can exercise a plurality of call answering options. For instance, the called party can allow an answering system/service answer the call, answer the call or ignore the call. In a preferred embodiment, if the tune master IP device is unable to correlate a tune to a caller identification information, or if the caller identification information is not presented to the tune master IP device, the tune master IP device rings using a default ring. In a preferred embodiment, the default ring is a default tune selected by the user. The process ends at 414.

Figure 5:
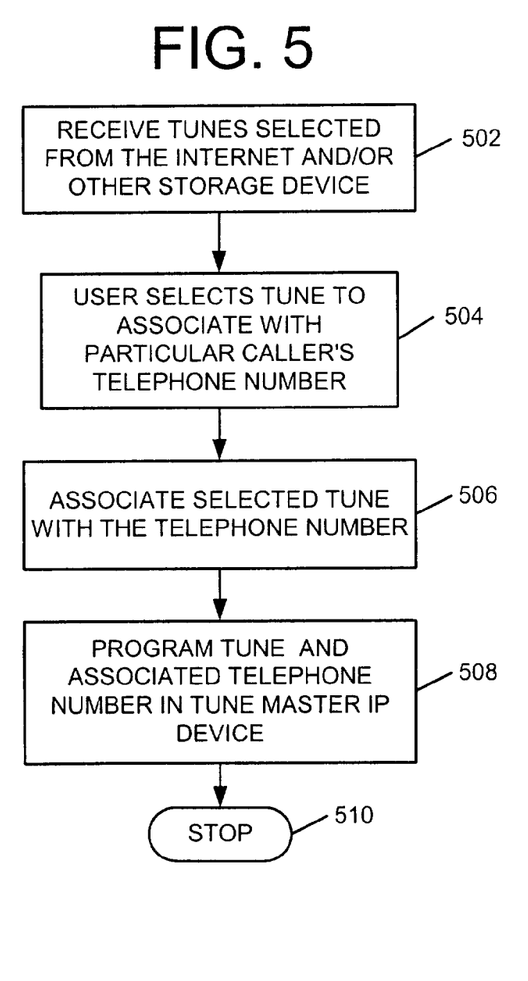
FIG. 5 is a flow chart depicting functionality of a preferred embodiment of an implementation of associating tunes with a telephone number of a tune master IP device system.

FIG. 5 is a flow chart depicting functionality (or a method) of a preferred embodiment of an implementation of associating tunes with a telephone number of a tune master IP device system. The process can be construed as beginning at 502, with a tune master IP device receiving tunes selected from the Internet and/or other storage device. At 504, a user selects the tune to be associated with a particular caller's telephone number. In a preferred embodiment, the user purchases and/or downloads a selection of tunes that are configured to work with the tune master IP device. At 506, the user selects tune(s) in the tune master IP device to associate with particular telephone numbers. In a preferred embodiment, the telephone number will be presented to the user's telephone through caller identification information. At 508, the user programs the tune and the associated telephone number in the tune master IP device. The process ends at 510.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method of playing a tune on a tune master IP device comprising:
    accessing a storage device external from the tune master IP device having a selection of digitized tunes utilizing a communications network;
    selecting from a storage device in which the digitized tunes are associated with names of potential calling parties the digitized tune associated with the name of the calling party from caller ID information;
    playing the digitized tune through a speaker external to the tune master IP device as notification of receipt of an incoming telephone call from the calling party;
    presenting the incoming telephone call through a handset separate from the speaker; and
    providing a default tune when no tune is associated with the name of the caller, the default tone being selectable by a user.

2. The method of claim 1, further comprising converting the incoming telephone call and associated caller identification information to data packets and routing the data packets to the tune master IP device.

3. The method of claim 2, further comprising establishing a connection between the incoming telephone call and the tune master IP device.

4. The method of claim 2, wherein the routing the data packets to the tune master IP device further comprises querying a processor in the communications network for an internet protocol address of the tune master IP device.

5. The method of claim 1, further comprising providing a standard ring tone when no tune is associated with the name of the caller.

6. The method of claim 1, further comprising providing a standard ring tone when no caller identification information is received with the incoming telephone call.

7. The method of claim 1, wherein the accessing the storage device having a selection of digitized tunes utilizing a communications network further comprises accessing tunes resident on at least one of a CD-ROM, DVD, tape, cassette, floppy disk, memory card, and a large capacity disk.

8. The method of claim 1, wherein the selecting a digitized tune further comprises programming the tune master IP device with digitized tunes from a pre-programmed category of tunes provided to the tune master IP device.

9. The method of claim 1, further comprising determining that caller identification information is associated with the digitized tune, and playing the digitized tune as notification of the incoming telephone call.

10. The method of claim 1, wherein the accessing the storage device having a selection of digitized tune utilizing a communications network is performed by utilizing the Internet as the communications network.

11. A computer-readable medium storing computer-executable instructions for selecting a tune by a tune master IP device, the computer-executable instructions configured to cause a computer to perform at least the following:
    access a storage device external to the tune master IP device having a selection of tunes utilizing a communications network;
    select from a storage device in which the digitized tunes are associated with names of potential calling parties the tune associated with the name of the calling party from the caller ID information;
    play the tune through a speaker external to the tune master IP device as notification of receipt of an incoming telephone call from the calling party;
    present the incoming telephone call through a handset separate from the speaker; and
    provide a default tune when no tune is associated with the name of the caller, the default tune being selectable by a user.

12. The computer-readable medium of claim 11, the computer-executable instructions further configured to cause the computer to convert the incoming telephone call to data packets and to route the data packets to the tune master IP device.

13. The computer-readable medium of claim 12, the computer-executable instructions further configured to cause the computer to establish a connection between the incoming telephone call and the tune master IP device.

14. The computer-readable medium of claim 12, the computer-executable instructions further configured to cause the computer to query a processor in the communications network for an Internet protocol address of the tune master IP device.

15. The computer-readable medium of claim 11, the computer-executable instructions further configured to cause the computer to provide a standard ring tone when no tune is associated with the calling party.

16. The computer-readable medium of claim 11, the computer-executable instructions further configured to cause the computer to provide a standard ring tone when no caller identification information is received with the incoming telephone call.

17. The computer-readable medium of claim 11, the computer-executable instructions further configured to cause the computer to access tunes resident on at least one of a CD-ROM, DVD, tape, cassette, floppy disk, memory card, and a large capacity disk.

18. The computer-readable medium of claim 11, the computer-executable instructions further configured to cause the computer to program the tune master IP device with tunes from a list of pre-programmed tunes provided to the tune master IP device.

19. The computer-readable medium of claim 11, the computer-executable instructions further configured to cause the computer to determine that the caller identification information is associated with the tune, and to play the tune as a notification of the incoming telephone call.

20. The computer-readable medium of claim 11, the computer-executable instructions further configured to cause the computer to utilize the Internet as the communications network.

21. A tune master IP system, comprising:
a communications network interface operative to receive caller identification information for an incoming telephone call;
a processor having telephony capabilities, the processor operatively coupled to the communications network interface, the processor further configured to receive the caller identification information for the incoming telephone call, to access a first storage device external to the tune master IP system having tunes to associate with names of potential calling parties, to associate a tune with a calling name from the caller ID information, to play the tune associated with the calling name through a speaker external to the tune master IP system as notification of the incoming telephone call, and to provide a default tune when no tune is associated with the name of the caller, the default tune being selectable by a user; and
a handset configured to present the incoming telephone call to a called party.

22. The system of claim 21, wherein the processor is configured to access the storage device utilizing the communications network interface.

23. The system of claim 22, wherein the communications network interface interfaces with an Internet.

24. The system of claim 21, wherein the processor is included in a tune master IP device.

25. The system of claim 21, wherein the tune is pre-selected from a plurality of tunes and wherein each tune is associated with the calling name of a particular caller.

26. The system of claim 21, further comprising a second storage device having a list of tunes associated with caller identification information.

27. The system of claim 24, wherein the tune master IP device is adapted to select tunes selectable from the first storage device.

28. The system of claim 21, wherein the first storage device is at least one of a CD-ROM, DVD, tape, cassette, floppy disk, memory card, and a large capacity disk.

29. The system of claim 21, wherein the caller identification information comprises a telephone number.

30. A tune master IP system, comprising:
means for providing caller name information for an incoming telephone call;
means for processing, the means for processing including telephony capabilities, and the means for processing is operatively coupled to the means for providing caller name information for an incoming telephone call and further configured to receive the caller name information for the incoming telephone call, to access a storage device external to the tune master IP system having tunes to associate with names of potential calling parties, to associate a tune with the caller name information, to play the tune associated with the caller name information through a speaker external to the tune master IP system as notification of the incoming telephone call, and to provide a default tune when no tune is associated with the name of the caller, the default tune being selectable by a user; and
means for presenting the call, separate from the speaker, to a called party.

31. The system of claim 30, further comprising means for selecting a tune to associate with the caller name information.

32. An apparatus, comprising:
a first storage device having a tune associated with a caller name of an incoming telephone call;
a processor adapted to communicate with the first storage device, to select from a second storage device external from the apparatus in which digitized tunes are associated with names of potential calling parties, the tune associated with the caller name to play the tune through a speaker external to the apparatus as an audible notification of the incoming telephone call, and to provide a default tune when no tune is associated with the name of the caller, the default tune being selectable by a user;
a network interface coupled to the processor, the network interface configured to access a communications network providing the incoming telephone call and associated internet protocol (IP) address; and
a handset configured to present the incoming telephone call to a called party.

33. The apparatus of claim 32, wherein the processor is configured to send and receive telephone calls between a communications device operatively coupled to the communications network.

34. The method of claim 1, further comprising organizing the names of the potential calling parties according to categories.

* * * * *